United States Patent Office 3,313,523
Patented Apr. 11, 1967

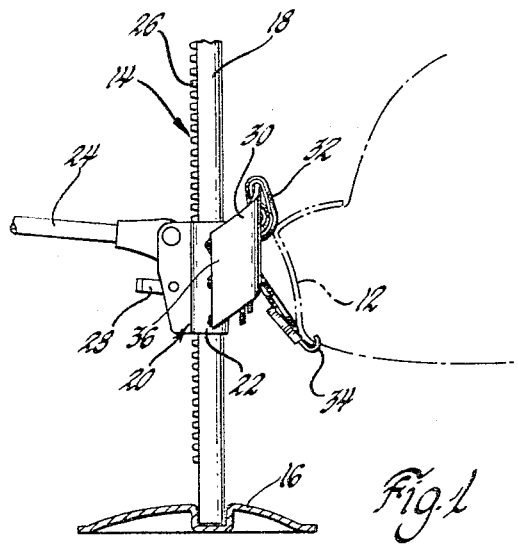
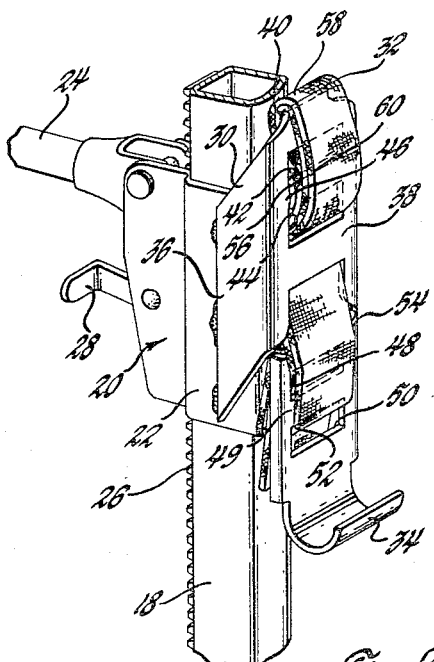
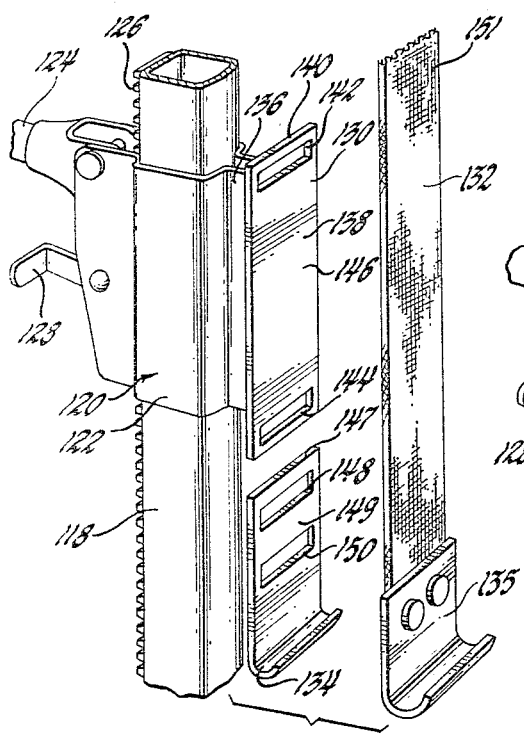
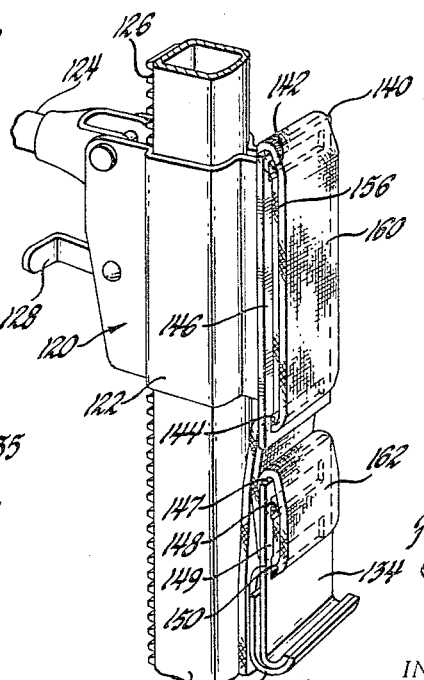

3,313,523
BUMPER JACK CONSTRUCTION
Richard L. Reynolds, Rochester, Mich., assignor to General Motors Corporation, Detroit, Mich., a corporation of Delaware
Filed Oct. 20, 1965, Ser. No. 498,226
11 Claims. (Cl. 254—133)

My invention relates generally to a bumper jack or the like and more particularly, to the movable load lifting assembly thereon. Since the automobile industry, in recent years, has changed the style of its automobiles more often, and in some cases even yearly, it has been necessary to likewise change the bumper engaging members on the lift jacks in order to conform to the changing bumper profiles.

My invention is directed toward providing a standardized load lifting assembly for a jack which is capable of use with a multitude of possible bumper configurations, thus eliminating the need for redesigning the bumper engaging member with each change in bumper profile. Another advantage is that a manufacturer could use a single standardized jack for an entire line of automobiles even though different makes or models produced by the manufacturer would have different bumper profiles. This adaptability to changing bumper profiles I have generally accomplished by providing a flexible strap suspended from the load lifting assembly and provided with a hook at its lower end. The hook engages the lower edge of the bumper while the flexibility of the strap allows it to conform to the contour of the bumper. I have also found that because of the diversity in both the height and depth of the various bumper contours, it is highly desirable that the flexible strap be adjustably mounted on the movable load lifting member to accommodate this diversity in height and depth. My invention is directed specifically toward providing a flexible strap bumper engaging member which is adjustably secured to the load lifting member in a simple and unique manner providing ease of adjustment with a minimum of effort to accommodate a multitude of bumper configurations having a great diversity in height and depth.

The exact nature of this invention as well as other objects and advantages thereof will be readily apparent from consideration of the following specification relating to the annexed drawing in which:

FIGURE 1 is an elevation view showing a jack provided with a movable load lifting member in accordance with a first embodiment of my invention and showing its operational relationship to an automobile bumper.

FIGURE 2 is an enlarged perspective view of a portion of the jack stand and the movable load lifting member of FIGURE 1.

FIGURE 3 is an enlarged perspective exploded view of a portion of the jack stand and a second embodiment of a movable load lifting assembly in accordance with my invention.

FIGURE 4 is a perspective view similar to FIGURE 3 except that the exploded parts are shown in their assembled positions.

Referring to FIGURE 1 in detail, I have shown the outline of the rear portion of an automobile in phantom with the bumper contour identified by the numeral 12. A bumper jack indicated generally at 14 comprises a base 16, a rack bar 18, and a load lifting assembly 20 movably mounted on the rack bar 18. The rack bar 18 may be held vertically by the base 16 or may tilt slightly from the vertical in order to add stability to the bumper jack as the automobile is lifted off the ground.

The movable load lifting assembly 20 comprises a body 22 which is telescoped about the rack bar 18. Handle 24 pivotally mounted on the body 22 operates a pawl (not shown) which cooperates with teeth 26 on the rack bar to move the assembly 20 up and down the rack bar 18. Trip lever 28 is movable between first and second positions to determine the direction of movement of the load lifting assembly in the conventional manner. The body 22 also carries a support member 30 which faces the bumper 12. A flexible strap 32 adjustably secured to the support member 30 has a hook 34 at its lower end which engages the lower edge of the bumper 12 to lift it and the automobile as the assembly 20 is moved upwardly along the rack bar 18.

Referring now to FIGURE 2, the mounting of the flexible strap 32 on the support member 30 is shown in detail. The support member 30 comprises a U-shaped channel welded or otherwise suitably secured to the body 22 at its open edges 36. This provides a flat face plate 38 having an upper horizontal edge 40. The face plate 38 is provided with upper and lower elongated slots 42 and 44, respectively, which have their longer sides substantially parallel to the upper edge 40. The slots are at least as wide as the strap 32 so as to be able to threadably receive it. An outwardly facing planar surface 46 on the plate 38 is bounded by the slots 42 and 44.

The hook 34 is J-shaped and also has upper and lower horizontally elongated parallel slots 48 and 50, respectively, in its vertical portion. A second planar surface 49 is found on the hook 34 between the slots 48 and 50. As shown in FIGURE 2, the strap 32 comprises a double strand which is formed by doubling or folding over a single strand upon itself. The hook 34 is secured to the folded end 52 of the strap 32 by threading a single strand only through the slots 48 and 50 so that the doubled end 52 lies in the lower slot 50. The hook 34 then is supported by having the upper edge of its lower slot 50 lie in the bight formed by the folded end 52 of the doubled strap 32. Both strands of the strap 32 adjacent the folded end 52 overlie the portion 54 of the hook 34 above the upper slot 48 to aid in stabilizing the hook during jack operation.

The strap 32 is adjustably secured to the support member 30 in the following manner: The double strand passes through the lower slot 44 from rear to front, continues upwardly and loops over the upper edge 40. Having reversed direction, the strap 32 continues downwardly behind plate 38 to pass through upper slot 42 from front to rear. The strap 32 now overlies the surface 46. The portion 56 which overlies the surface 46 is sandwiched between it and the outer upwardly threaded portion 60. The portions 56 and 60 are connected by the portion 58 which is looped over edge 40. The double strand strap portion 56 exits through the lower slot 44 but in the opposite direction, that is, from front to rear. The free ends of the double stranded strap hang below support 30 behind hook 34. The operation of my device should be obvious. Unloaded, the length at which the hook 34 is disposed below the support member 30 can be adjusted by appropriately adjusting the strap 32 in the slots 42 and 44 much in the same manner that an ordinary strap and slide is adjusted. When the length of the hooked end of the strap 32 and the position of the assembly 20 on the rack 18 are at their desired adjustment, hook 34 is engaged with the lower edge of bumper 12. The assembly 20 is then "jacked" up the rack bar 18 lifting the automobile and loading the jack. When loaded, the downward force on the hook 34 pulls the outer portion strands 60 downwardly, snubbing them over the upper edge 40, and clamping the inner portion strands 56 between them and the surface 46. This snubbing and clamping action along with the frictional contact between the surfaces of the strands overlying the surface 46 secures the strap in its adjusted position on the plate 38 of the movable load lifting member 22.

Thus, it can be seen this first embodiment facilitates adjustment of the bumper engaging member which member is then automatically secured in its adjusted position by merely applying a load to the hook 34.

Referring to FIGURES 3 and 4 and the second embodiment of my invention, the movable load lifting assembly 120 comprises a body 122 which is telescoped about the rack bar 118. A handle 124 pivotally mounted on the body 122 operates a pawl (not shown) which cooperates with the teeth 126 on the rack bar to move the assembly 120 up and down the rack bar 118. Trip lever 128 pivotally mounted on the body 122 is movable between first and second positions to determine the direction of movement of the load lifting assembly in the conventional manner. The body 122 also carries a support member 130 adapted to face an automobile bumper. A flexible strap 132 adjustably secured to the support member 30 has a hook 134 secured to its lower end adapted to engage the lower edge of a bumper to lift it and the automobile as the assembly 120 is moved upwardly along the rack bar 118.

The support member 130 comprises a flat substantially vertically disposed face plate 138 suitably secured to a pair of forwardly extending flanges 136 on the body 122. The face plate 138 has an upper horizontal edge 140 and is provided with upper and lower elongated slots 142 and 144, respectively. The elongated slots have their longer sides substantially parallel to the upper edge 140 and are at least as wide as the strap 132 so that they are adapted to threadably receive it. An outwardly facing planar surface 146 is bounded by the slots 142 and 144.

The hook 134 is J-shaped and also has upper and lower horizontally elongated parallel slots 148 and 150, respectively, in its vertical portion. The vertical portion of the hook 134 provides a second upper horizontal edge 147 and a second planar surface 149 between the slots 148 and 150. As shown in FIGURE 3, the strap 32 comprises a single strand having a free end 151 and a second J-shaped hook 135 riveted to the opposite end. The second hook 135 is adapted to have the hook 134 nested in it. The hook 134 is secured to the hooked end of the strap 132 by nesting hook 134 in hook 135 and threading the strap 132 through the lower slot 150 from rear to front. The belt then continues up, loops over edge 147 and is threadably received in upper slot 148 from front to rear. The strap continues downwardly between the upward outer portion 162 and the planar surface 149. The strap exits through the lower slot 150 from front to rear and reverses direction by pivoting about the upper edge of the lower slot 150. The strap 132 then continues upwardly and is adjustably secured to the support member 130 in the following manner: The strap 132 first passes through the lower slot 144 from rear to front, continues upwardly, and loops over the upper edge 140. The strap then returns through the upper slot 142 from rear to front and continues downwardly between the outer portion 160 on strap 142 and the planar surface 146. The free end 151 of the strap then passes out through the lower slot 144 from front to rear and hangs down behind hook 134. The operation of the second embodiment should be obvious. Unloaded, the length at which the hook 134 is disposed below the support member 130 can be adjusted by appropriately adjusting the strap 132 in the slots 142 and 144 much in the same manner that an ordinary strap and slide is adjusted. When the length of the hooked end of the strap 132 and the position of the assembly 120 on the rack 118 are at their desired adjustments, hook 134 is engaged with the lower edge of an automobile bumper. The assembly 20 is then "jacked" up the rack bar 18 and the jack is loaded. Loaded, the downward force on the hook 134 pulls the outer portion 160 downwardly and clamps the inner portion 156 between it and the surface 146. This clamping engagement along with the frictional contact between the surfaces of the strap strands 156 and 160 and between the strand 156 and the surface 146 secures the strap in its adjusted position on plate 138 of the movable load lifting member 122.

Thus, it can be seen this second embodiment also facilitates adjustment of the bumper engaging member which is then automatically secured in its adjusted position by merely applying a load to the hook 34.

It should be understood, of course, that the foregoing disclosure relates to only preferred embodiments of the invention and that numerous modifications or alterations may be made therein without departing from the spirit and scope of the invention as set forth in the appended claims.

I claim:

1. In a movable load lifting assembly for a bumper jack or the like, the combination comprising plate means having an outwardly facing surface, substantially horizontal bar means on said plate means spaced from said surface, a flexible strap adjustably secured to said plate by having a first portion overlie said surface, a second contiguous portion looped over said bar means whereby said belt is reversed upon itself so that a third portion of said belt overlies said first portion, means to maintain said first and third belt portions in frictional engagement and said first portion and said surface in frictional engagement, and vehicle hook engaging means carried by said strap.

2. The combination as described in claim 1 wherein said plate means is substantially vertically disposed with its upper edge substantially horizontal and wherein said bar means is provided by an elongated slot in said plate means parallel to said upper edge which is adapted to threadably receive said strap.

3. The combination as described in claim 1 wherein said second last-mentioned means comprises an elongated slot in said plate means substantially parallel to and on the side of said surface opposite to said bar means, said slot being adapted to threadably receive said strap.

4. The combination as described in claim 3 wherein said second last-mentioned means further includes a second elongated slot in said plate means parallel to and spaced from said elongated slot to define said surface therebetween, said second slot being adapted to threadably receive said strap and wherein said vehicle hook engaging means is carried by said strap below said slots.

5. In a movable load lifting assembly for a bumper jack or the like, the combination comprising a substantially flat plate with a horizontal upper edge, said plate having a pair of elongated vertically spaced slots with their longer sides parallel to said upper edge, an outwardly facing surface on said plate between said slots, a flexible strap adjustably secured to said plate by passing through said lower slot, overlying said surface, passing through said upper slot, looping over said upper edge to reverse and overlie itself, and passing through said lower slot, and vehicle engaging means including means to secure said vehicle engaging means to said strap below said second slot whereby application of a downward load to said vehicle engaging means fixes said strap in an adjusted position by maintaining said strap in frictional engagement with itself and said surface between said slots.

6. The combination as described in claim 5 wherein said vehicle engaging means comprises a hook having a second pair of vertically spaced elongated slots to form a second outwardly facing surface therebetween, said slots being adapted to threadably receive and cooperate with said strap to secure said hook to said strap below said second slot in said plate.

7. The combination as described in claim 5 wherein said strap comprises a double strand.

8. The combination as described in claim 5 wherein said strap comprises a double strand formed by folding over a single strand upon itself and wherein said vehicle engaging means is secured to said strap at said folded end.

9. The combination as described in claim 6 wherein said plate is substantially vertically disposed, said strap comprises a double strand formed by folding over a single strand upon itself, said hook is secured to said strap at said folded end by threading said strap through said second pair of slots so that said folded end is disposed in said second lower slot.

10. The combination as described in claim 6 wherein said strap comprises a single strand having two free ends, one of which is secured to said hook by passing through said second lower slot, overlying said second surface, passing through said second upper slot, looping over the upper edge of said hook to reverse and overlie itself and passing through said second lower slot whereby said strap is maintained in frictional engagement with itself between said second pair of slots.

11. The combination as described in claim 10 wherein said plate is substantially vertically disposed and said one end has a second hook secured thereto in which said first hook is nested.

References Cited by the Examiner
UNITED STATES PATENTS 3,108,784 10/1963 Ulm _____ 254—110
3,159,381 12/1964 Graafsma et al. _____ 254—100

WILLIAM FELDMAN, *Primary Examiner.*

OTHELL M. SIMPSON, *Examiner.*